(12) United States Patent
Aloisio et al.

(10) Patent No.: US 6,243,523 B1
(45) Date of Patent: Jun. 5, 2001

(54) COATED OPTICAL FIBER WITH INCREASED MODULUS AND THERMALLY ENHANCED STRIPPABILITY

(75) Inventors: Charles Joseph Aloisio, Atlanta, GA (US); Arturo Hale, New York, NY (US); Valerie Jeanne Kuck, Upper Montclair, NJ (US); John Francis Malluck, Marietta, GA (US); Peter Gerald Simpkins, Chatham, NJ (US); Hakan Tornqvist, Gothenborg (SE)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/443,739

(22) Filed: Nov. 19, 1999

Related U.S. Application Data (63) Continuation of application No. 09/342,611, filed on Jun. 29, 1999, now abandoned.

(51) Int. Cl.$^7$ .................................................. G02B 6/02
(52) U.S. Cl. .............................................................. 385/128
(58) Field of Search ................................................ 385/128

(56) References Cited

U.S. PATENT DOCUMENTS 6,014,488 * 1/2000 Shustack ............................... 385/128

\* cited by examiner

Primary Examiner—Frank G. Font
Assistant Examiner—Amanda Merlino
(74) Attorney, Agent, or Firm—Lowenstein Sandler PC (57) ABSTRACT

In accordance with the invention, an optical fiber is provided with a protective coating having enhanced thermal characteristics for easy removal from the optical fiber. In particular, at elevated temperatures used in stripping, the delamination resistance drops to low levels substantially independent of modulus. This permits fabrication of a protectively coated fiber which has relatively high modulus and delamination resistance at room temperature but, due to its enhanced thermal characteristics, is nonetheless relatively easy to strip at elevated temperatures. Thus, for example, applicants can provide a protectively coated optical fiber or ribbon with a room temperature modulus of at least 90 psi, and a high temperature delamination resistance that is less than 40% of the room-temperature delamination resistance and preferably less than 30%. Coatings based on a polyether backbone and non-polar monomers are preferred.

16 Claims, 4 Drawing Sheets

COATED OPTICAL FIBER WITH INCREASED MODULUS AND THERMALLY ENHANCED STRIPPABILITY

RELATED APPLICATION

This application is a continuation of U.S. patent application Ser. No. 09/342,611, filed Jun. 29, 1999, abandon.

TECHNICAL FIELD

This invention relates generally to a protective coating for an optical fiber, and more particularly to a coating of increased modulus and enhanced thermal characteristics for easy removal from the optical fiber.

BACKGROUND OF THE INVENTION

In the manufacture of optical fiber, a glass preform rod is suspended vertically and moved into a furnace at a controlled rate. The preform softens in the furnace and a glass fiber (also referred to as an optical fiber) is drawn freely from the molten end of the preform rod by a capstan located at the base of a draw tower. Because the surface of the glass fiber is susceptible to damage caused by abrasion, it is necessary to coat the fiber immediately after it is drawn but before it comes into contact with any surface. Inasmuch as the application of a coating material must not damage the glass surface, the coating material is applied in a liquid state. Once applied, the coating material must solidify before the glass fiber reaches the capstan. This is typically accomplished within a brief time interval by photocuring—a process in which the liquid coating material is converted to a solid upon exposure to electromagnetic radiation, preferably ultraviolet (UV) light.

Because the fibers are thin and flexible, they are readily bent when subjected to mechanical stresses such as those encountered during handling or exposure to varying temperature environments. Such bends in the fiber frequently result in optical loss that is much greater than the intrinsic loss of the fiber itself, and it has been found desirable to protect the glass fiber against such bending. Accordingly, the coating material is required to cushion the glass fiber against bends and two layers of coating materials are typically applied to the drawn optical fiber. An inner (primary) coating, having a relatively low in situ equilibrium modulus, is applied directly to the glass fiber. The in situ modulus of the primary coating is the equilibrium modulus of the coating measured on the fiber. An outer (secondary) coating, having a relatively high modulus, surrounds the primary coating. Together, these coatings protect the inherently high tensile strength of the glass fiber as long as the primary coating remains bonded to the glass.

The interfacial bond between the fiber and the primary coating desirably is strong to prevent bond failure during fiber manufacturing and subsequent handling. Such failure can result in the formation of a "delamination" area which can adversely affect the optical performance of the fiber. A delaminated area is characterized by a gap at the interface of the fiber and the primary coating. The gap alters the mechanical properties at the point of delamination and may cause fiber transmission losses. Even if the optical performance is substantially not affected, the delamination can result in negative customer perception and is therefore unacceptable. Thus, the fiber/primary coating bond desirably should be robust.

Delamination resistance at a given temperature is typically determined by supporting the coated fiber under tension on a support member and driving a cylindrical steel member with a known load against the fiber. After impact, the fiber is observed for delamination, and the test is repeated at another position on the fiber. The load for which 50% of the impacted areas delaminate is referred to as the delamination resistance ("DR50") of the coated fiber. Further details concerning the measurement of delamination resistance are set forth in U.S. Pat. No. 5,908,484 issued to R. L. Decker et al. on Jun. 1, 1999 and entitled "Method of Making A Coated Optical Fiber Comprising Measuring The Delamination Resistance of the Coating", which is incorporated herein by reference.

In what appears to be a requirement contradictory to delamination resistance, it is also desirable to be able to easily strip the primary coating from the glass fiber—particularly when a number of fibers are bonded together in an array such as shown in U.S. Pat. No. 4,900,126. Such an array is frequently referred to as a "ribbon." Indeed, if the coating materials cannot be cleanly and easily stripped, then splicing and interconnecting operations will be seriously hampered.

It is generally believed that the delamination resistance of a coated fiber (and its resistance to stripping) are proportional to the in situ modulus of the primary coating (hereinafter "modulus"). As a consequence, the choice of modulus level has not been to provide maximum protection to the fiber but rather has been constrained to the relatively lower levels associated with easy stripping.

SUMMARY OF THE INVENTION

In accordance with the invention, an optical fiber is provided with a protective coating having enhanced thermal characteristics for easy removal from the optical fiber. In particular, at elevated temperatures used in stripping, the delamination resistance drops to low levels substantially independent of modulus. This permits fabrication of a protectively coated fiber which has relatively high modulus and delamination resistance at room temperature but, due to its enhanced thermal characteristics, is nonetheless relatively easy to strip at elevated temperatures. Thus, for example, applicants can provide a protectively coated optical fiber or ribbon with a room temperature modulus of at least 90 psi, and a high temperature delamination resistance that is less than 40% of the room-temperature delamination resistance and preferably less than 30%. Coatings based on a polyether backbone and non-polar monomers are preferred.

BRIEF DESCRIPTION OF THE DRAWINGS

The invention and its mode of operation will be more clearly understood from the following detailed description when read with the appended drawing in which.

DETAILED DESCRIPTION

This description is divided into three parts: Part I describes the experimental results leading to the invention;

Part II describes typical fiber products to which the invention is applied; and Part III describes specific examples of coated fibers in accordance with the invention.

I. The Experimental Basis for the Invention

Applicants have investigated the mechanics of fiber stripping using a delaminator similar to the aforementioned Decker et al. patent. The delaminator presses a weighted 6 mm diameter steel rod against a coated fiber, and the operator observes through a microscope the formation of voids between the glass fiber and the primary coating in response to the applied force. The applied weight at which void formation is seen in half the samples is the delamination resistance ("DR50") of the coated fiber. The Decker et al. apparatus was modified by adding a heater and a video camera so that applicants could observe real-time delamination mechanics at elevated temperature.

Using this apparatus, applicants studied how the delamination resistance (DR) changes as the modulus is changed. It was previously believed that at room temperature the DR always increases monotonically and approximately linearly as the modulus increases. But contrary to this conventional belief, they discovered a series of coatings wherein the DR goes down with increasing modulus, goes through a minimum at about 90 psi and then goes up. They further found different behavior for this series at elevated temperatures. There the DR goes down as the modulus increases and eventually tapers off to a low level value. At all points, the high-temperature DR versus modulus curve lies below the room-temperature curve.

In view of these thermal characteristics, applicants recognized that at values of the modulus that lie above the minimum in the room-temperature curve, a coated fiber will exhibit a disproportionate reduction in delamination resistance when heated to elevated temperature, e.g. 140° C. Thus one can use coatings having high values of room temperature modulus and delamination resistance that have heretofor been avoided because presumed difficulty in stripping. The disproportionate reduction in delamination resistance at elevated temperatures avoids this difficulty. The modulus of the primary coating should be kept below about 500 psi in order to avoid excessive microbending losses.

Thus applicants have discovered coated fibers in which the primary coating has a modulus that lies above a first threshold. At room temperature, the fiber has a delamination resistance that lies above a second threshold. And at elevated temperature the delamination resistance drops below a third threshold significantly below the second. Reductions of 61% to 86% have been observed.

II. Typical Fiber Structures to Which the Invention Applies

Figure 1:
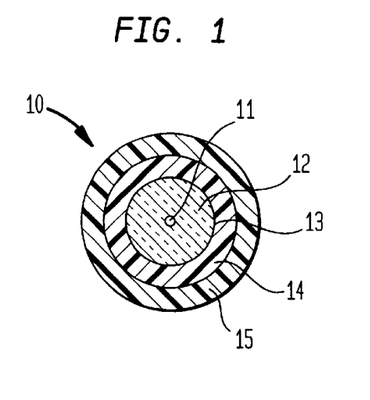
FIG. 1 is an end view, in cross section, of an optical fiber that includes a coating system in accordance with the present invention.

FIG. 1 shows an end view, in cross section, of a coated optical fiber 10 comprising a glass fiber 12 surrounded by a protective coating system comprising layers 14, 15. It is well known to draw glassy optical fiber from a specially prepared, cylindrical preform which has been locally and symmetrically heated to a temperature of about 2000° C. As the preform is fed into and through a furnace, glass fiber 12 is drawn from the molten material. A protective coating system is applied to the glass fiber 12 after it has been drawn from the preform that preferably comprises two layers of radiation-cured polymeric materials. An inner layer 14 contacts the glass fiber 12 at a glass-coating interface 13 and is referred to as a primary coating material. An outer layer 15, which is referred to as a secondary coating material, surrounds the inner layer. One method of applying dual layers of coating materials to a moving glass fiber is disclosed in U.S. Pat. No. 4,474,830 which issued on Oct. 2, 1984 to C. R. Taylor. Another method for applying dual layers of coating materials onto glass fiber is disclosed in U.S. Pat. No. 4,851,165, which issued on Jul. 25, 1989 to J. A. Rennell and C. R. Taylor. By way of illustration, the typical diameter of glass fiber 12 is about 125 micrometers, while the diameter of its core 11 is 140 generally less than 10 micrometers for single mode fibers. (Core 11 is the region where light is substantially confined during its propagation along the glass fiber's longitudinal axis by the refractive index profile of the glass fiber.) And finally, each layer of coating material has a thickness of about 30 micrometers so that the overall diameter of coated fiber 10 is approximately 250 micrometers.

Coating Materials

Coating materials not only protect the glass fiber from abrasion and cushion it against microbending loss, but they also help preserve its tensile strength. However, in order to preserve tensile strength, the primary coating material must stay bonded to the glass—at least until it is stripped off, and then it is desirable that it be fully removable without leaving a residue on the glass. More specifically, the interface between the primary coating material and the glass fiber must be characterized by suitable strength to prevent delamination and must be such that the coating system can be easily stripped from the optical fiber without tenacious residues being left on the fiber surface. On the other hand, the surface of the secondary coating material must be such that tacking does not occur between adjacent convolutions of the fiber, resulting in a jerky payoff from a process spool.

Coating materials typically comprise urethane-acrylate liquids whose molecules become crosslinked when exposed to ultraviolet light. Various additives are also present that enhance one or more properties of the coating. For example, photoinitiators are added to accelerate the curing process which is important because coated optical fiber is wrapped around spools for storage as soon as it is cured, and manufacturing speed is critical to profitability. Curing is the conversion of the liquid coating material into a solid. In the present system this process is known as free-radical cure wherein, upon absorption of light, the photoinitiator components cleave to form free radical pairs, which diffuse away from each other and react with acrylate-terminated components to initiate a chain polymerization process. In addition to photoinitiators, coating materials further include diluents, antioxidants, adhesion promoters and, in some cases, additives to improve strippability. However, before addressing strippability, it is important to first discuss the composition of the primary coating material which makes contact with the glass surface, and whose properties are the subject of the present invention.

Figure 2:
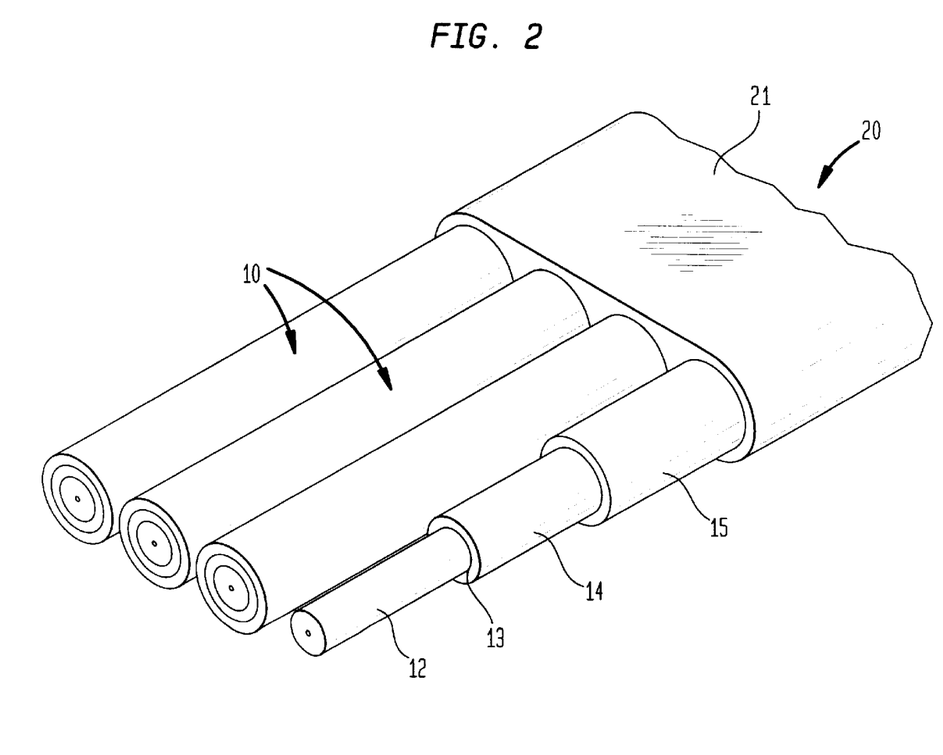
FIG. 2 is a perspective view of an optical fiber ribbon showing a group of coated glass fibers bonded together with a matrix material.

Referring now to FIG. 2, there is shown a perspective view of an optical fiber ribbon 20 showing a group of coated glass fibers 10—10 that are held together with an ultraviolet (UV)-curable matrix bonding material 21. The group of optical fibers are disposed in a coplanar parallel array, and while only four fibers are shown, such arrays typically comprise eight or more individual fibers. The equilibrium modulus of the matrix material has a value less than that of the outer coating layer of the fiber but greater than the equilibrium modulus of the inner coating layer. The matrix material 21 fills the interstices, bonds together the optical fibers, and extends to the outside boundary of the ribbon. Known UV-curable matrix materials 21 comprise a resin, a diluent and a photoinitiator. More detailed information regarding bonded arrays of optical fibers is available in the aforementioned U.S. Pat. No. 4,900,126.

Ribbon Stripping

Figure 3A:
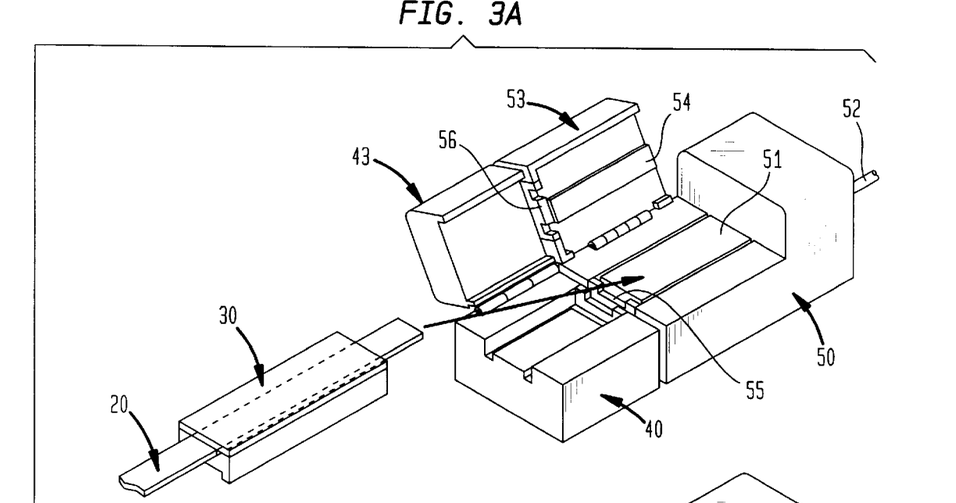
FIGS. 3A–3C illustrate the use of a ribbon-stripping tool showing three progressive stages in the removal of matrix and coating materials from a group of glass fibers.
Figures 3B, 3C:
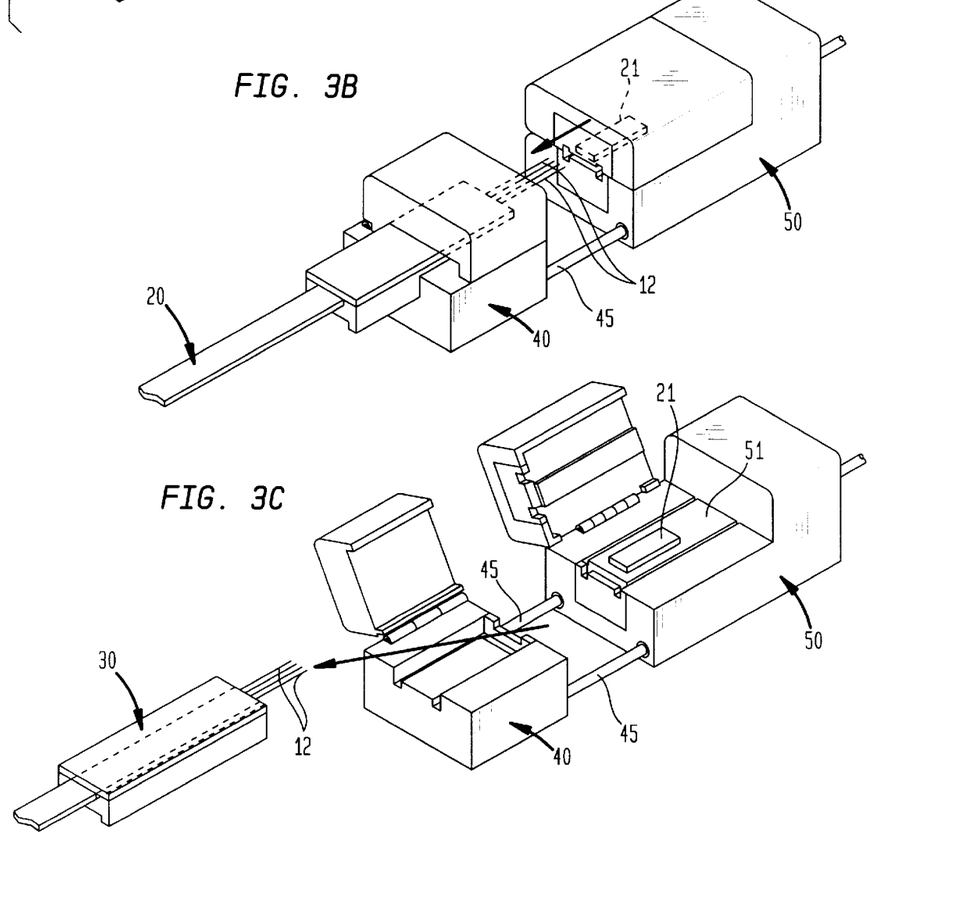

Reference is made to FIGS. 3A–3C, which illustrates use of a ribbon-stripping tool such as used by splicing technicians for mass fusion splicing. FIG. 3A shows the principal elements of the ribbon stripping tool and associated apparatus. Ribbon 20 is placed within fiber holder 30 to facilitate handling of the fiber during the stripping process. The stripping tool comprises a holder grip 40 and a main body 50 that are used for removing the various layers that surround a bonded fiber array. Lid 53 is closed during the stripping operation and includes an inner surface 54 which cooperates with a heated platen 51 to frictionally hold the outside jacket material surrounding the glass fibers within ribbon 20.

Referring first to FIG. 3A, fiber holder 30 is shown in its closed position around ribbon 20 which is about to be inserted into the ribbon-stripping tool. The portion of ribbon 20 which is to have its coating layers removed extends beyond the forward end of the fiber holder so that it can be captured between platen 51 and the inside surface 54 of lid 53 when the lid is closed onto the main body 50. Upon closure, opposing blades 55, 56 are positioned to cut partially into opposite sides of ribbon 20 so that a well-defined break in the coating material can be made. The particular tool used is electrically heated from an AC power source, which is converted to 12 volts DC for use by a heater element within the main body 50. Holder grip 40 is adapted to capture fiber holder 30 therein when its lid 43 is closed.

FIG. 3B illustrates the movement of holder grip 40 away from the main body 50 of the ribbon-stripping tool. Guide rails 45—45 allow the holder grip to slide into engagement with the main body in a controlled manner. A heater (not shown) within the main body raises the temperature of platen 51 to a predetermined level which weakens/breaks the adhesive bond at the interface 13 between primary coating 14 and glass fiber 12 (see FIG. 1 or 2) of the various coated fibers. Illustratively, a temperature of 100–200° C. for about 10 seconds provides acceptable results. Once the bond is weakened/broken the rest of the operation involves sliding the primary coating along the glass fiber surface. The ability of the primary coating to slide will depend on it sliding friction with the glass fiber. This action will determine how easily the composite (matrix 21 and coatings 14, 15) can be removed and the amount of residue that remains on the bare glass fibers.

Figures 4A, 4B, 4C:
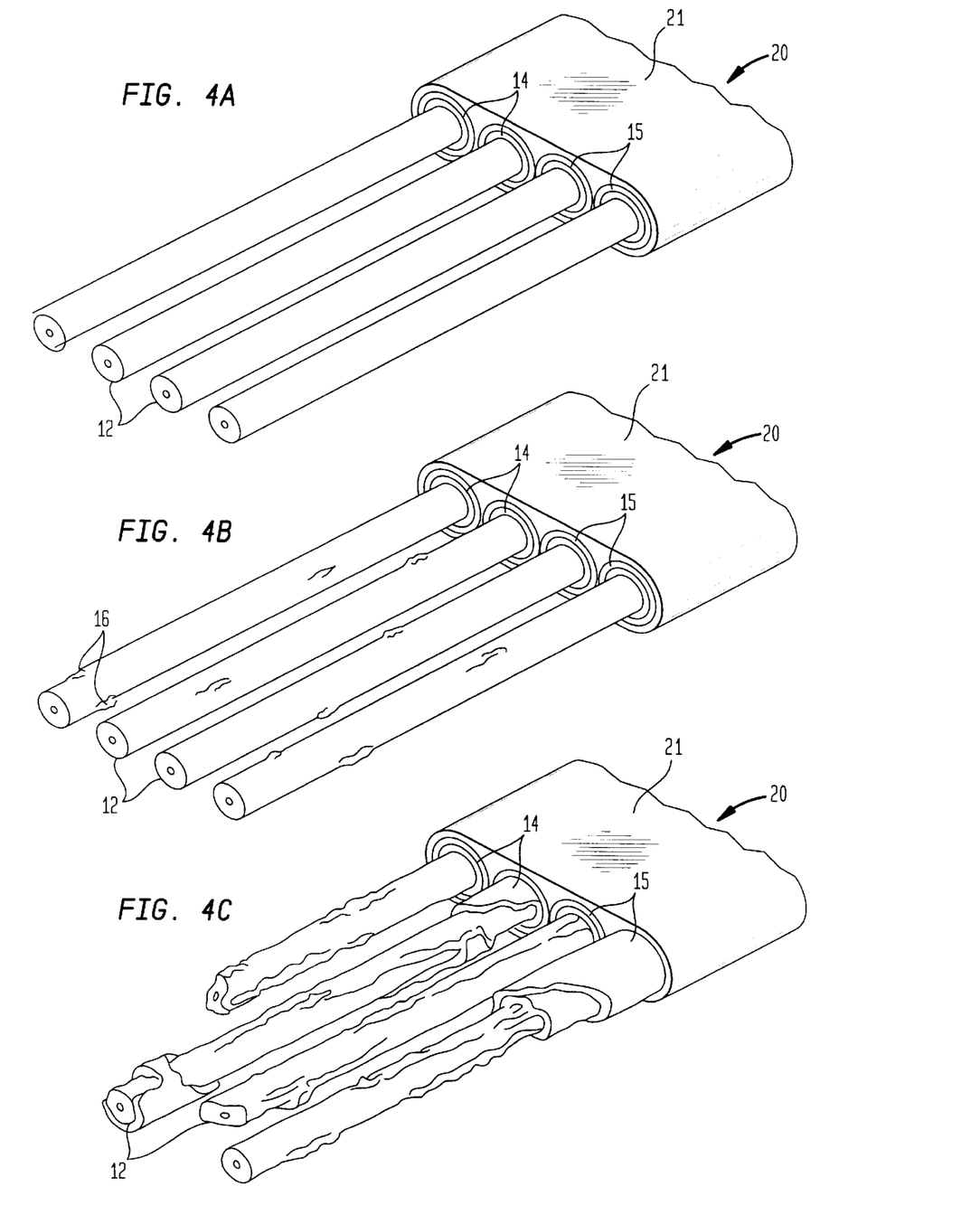
FIGS. 4A–4C illustrate various outcomes of the ribbon-stripping procedure.

Finally, FIG. 3C shows end results of the ribbon stripping process in which glass fibers 12—12 protrude from ribbon 20 which is still held within the fiber holder 30. And matrix material 21, which has just been stripped away, remains on the heated platen 51 of the main body 50. Having stripped the matrix and coating materials away from the glass fibers 12—12, FIGS. 4A–4C are used for illustrating the various possible results of the stripping process and for discussing their acceptability. For example, FIG. 4A shows an ideal condition wherein the matrix 21 and coating materials 14, 15 are fully removed from the glass fibers 12—12. Such results are frequently possible with the present invention although the presence of some residues 16—16, as shown in FIG. 4B, is less desirable but acceptable provided they can be removed by gentle wiping with an alcohol-moistened cotton swab. However, FIG. 4C illustrates an unacceptable condition in which the coating materials have clung to the glass fibers so tenaciously that either breakage occurs or large patches remain that cannot be easily removed.

Figure 5:
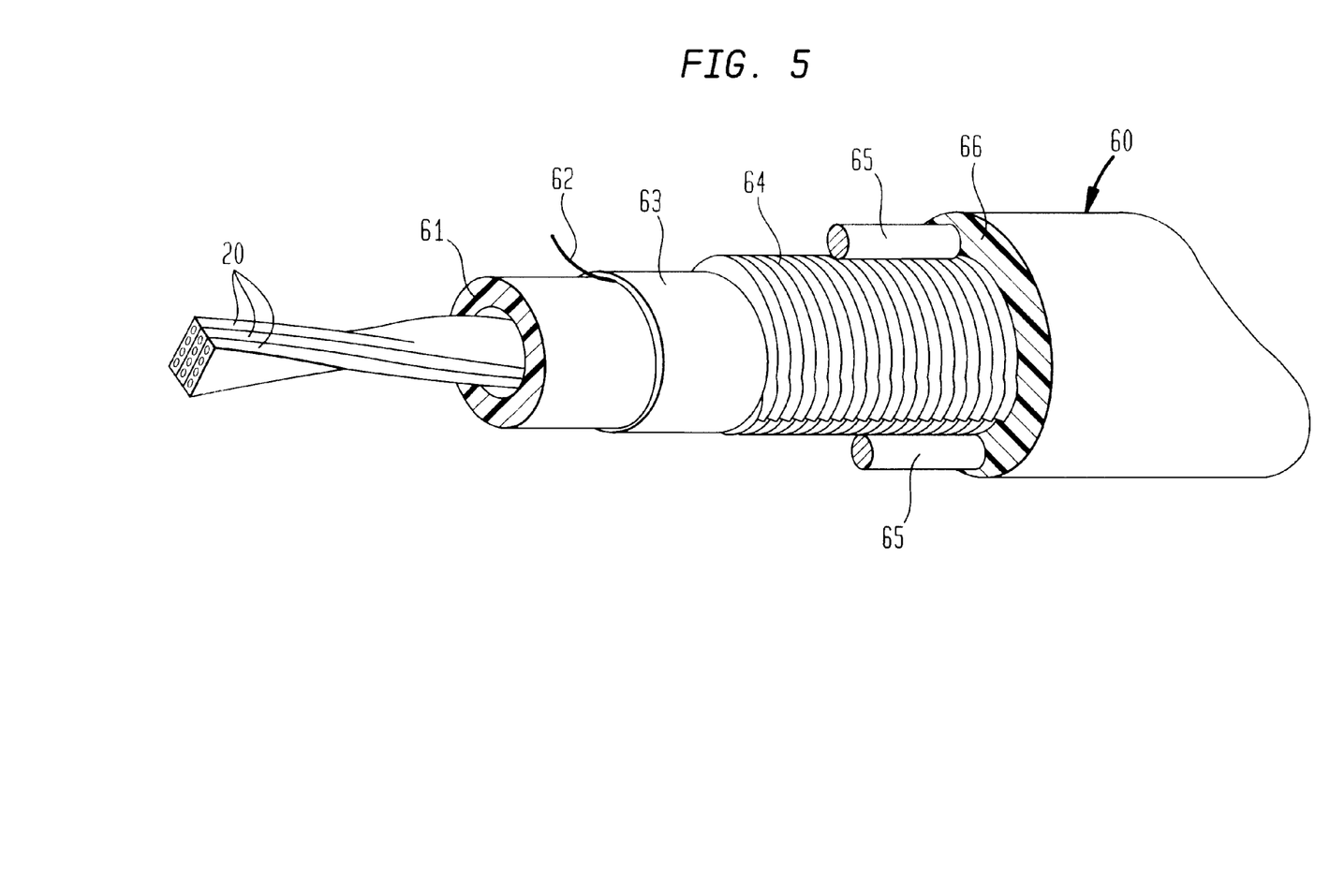
FIG. 5 discloses a cable having a number of optical fiber ribbons.

Bonded arrays of optical fibers, as discussed above, are commercially available. Each ribbon comprises twelve fibers, and as many as twelve ribbons are stacked together for high density. The ribbon stack is surrounded by a core tube that may also contain a filler that prevents the incursion of water in outside plant applications. FIG. 5 provides greater detail regarding the construction of a practical cable according to the present invention. Optical cable 60 includes ribbons 20 as discussed above. These ribbons are disposed within a tubular member 61, which is made from a dielectric material such as polyvinyl chloride or polyethylene, for example. Surrounding tubular member 61 is a water-absorbing tape 63, a corrugated metallic shield 64, and plastic jacket 66. A ripcord 62 made of Kevlar® plastic, facilitates sheath removal, and jacket 66 of polyethylene material, for example, encloses strength members 65—65. Strength members are used to eliminate or reduce stresses that might otherwise be applied to the optical fibers during handling or normal service, and may be included within the cable 60 in any number of known ways. Typically, a filling material is disposed within the tubular member 61 that serves to cushion the fibers contained therein, thereby protecting against microbending loss. Greater detail regarding the construction of cable 60 and suitable filling materials are disclosed in U.S. Pat. No. 4,844,575, which is hereby incorporated by reference.

III. Illustrative Embodiments

In illustrative embodiments of the invention the primary coating comprises an oligomer based on a polyether backbone. The polyether backbone is advantageously end-capped with acrylate groups via urethane linkages.

EXAMPLES

The following examples present commercial fibers used as controls and a series of coated fibers exhibiting the advantageous characteristics of the invention.

Example 1

A commercial fiber (we shall call it "control") having a modulus of about 75 psi sometimes displays delaminations after routine handling. The resistance to delamination determined with the method described in this application is DR50=218 g. The stripping performance of this fiber is acceptable but not very good. Coating residues remain on the fiber after stripping, and it is necessary to wipe them off, with the potential of damaging the fiber. The stripping behavior at high temperature has been observed under the microscope, and it can be seen that as the fiber is stripped, the coating seems to delaminate and heal immediately. The coating does not tube-off easily, and sometimes the fiber buckles. The delamination resistance measured at 140° C. is DR50=171 g.

Example 2

A commercial fiber from a different supplier having a modulus of about 105 psi also shows occasional delaminations after routine handling. Different lots of this fiber show DR50 values ranging from 200 to 270 g. This fiber strips very well. The process is easy and no residues are left behind. Microscopic examination of the stripping process at high temperature reveals that the coating separates from the glass as soon as the fiber is clamped down in the stripping tool, and as stripping takes place delaminations can be seen propagating through the fibers. The delamination resistance measured at 140° C. is DR50=139 g.

These two experiments reveal that there is both a qualitative and quantitative correlation between strippability and delamination resistance at high temperature. The fiber that strips easily (Example 2) has a relatively low delamination resistance at high temperature (DR50=139 g), and the microscopic observations demonstrate that delamination is associated with a clean stripping process. The fiber that does not strip so easily (Example 1) has a higher resistance to delamination at high temperature (DR50=171 g).

Example 3

Several UV-curable primary coating formulations based on either a polyester or a polyether urethane acrylate oligomer were prepared by blending the oligomer with acrylate monomers, photoinitator, and some additives as shown in the table below. The components of the formulations were varied in a systematic way to provide coatings with different elastic moduli and with different degrees of covalent coupling to the glass fiber. In addition, the monomers employed with the polyester oligomer were relatively polar, while the monomers used with the polyether oligomer were relatively non-polar. The blends were prepared simply by weighing the appropriate amount of ingredients and mixing them with a mechanical stirrer. The blends were then filtered through 1.2 micrometer filters. The viscosity of each of these formulations was between 6,000 and 7,000 cP at 23° C.

The materials used and the resulting compositions are set forth below:

| MATERIALS USED: | |
|---|---|
| IOMP | Isooctyl mercaptopropionate (Hampshire Chemical Corp., Lexington, MA) |
| MPTMS | Mercaptopropyl trimethoxysilane (United Chemical Technologies) |
| CN934 | CN934 oligomer from Sartomer (POLYETHER) |
| CN966R60 | CN966R60 oligomer from Sartomer (POLYESTER) |
| HDDA | 1,6- Hexanediol diacrylate (Sartomer SR 238) |
| LA | Lauryl acrylate (Sartomer SR 335) |
| ENPA | Ethoxylated nonyl phenol acrylate (SARTOMER SR 504) |
| DEGDA | Diethyleneglycol diacrylate (Sartomer SR 230) |
| EEEA | 2-(2-ethoxyethoxy) ethyl acrylate (Sartomer SR 256) |
| PETA | Pentaerythritol triacrylate (Sartomer SR 444) |
| TEGDA | Tetraethyleneglycol diacrylate (Sartomer SR 268) |
| TPGDA | Tripropylene glycol diacrylate (Sartomer SR 306) |
| I-1700 | Irgacure 1700 photoinitatior (Ciba Specialty Chemicals) |

| Material | wt. fraction |
|---|---|
| HP-107-PLN | |
| CN966R60 | 79.33 |
| PETA | 7.05 |
| EEEA | 6.81 |
| TEGDA | 2.89 |
| IOMP | 1.96 |
| I-1700 | 1.96 |
| P-210-PHY | |
| CN966R60 | 79.33 |
| PETA | 7.05 |
| DEGDA | 5.00 |
| TEGDA | 2.89 |
| MPTMS | 1.96 |
| I-1700 | 1.96 |
| EEEA | 1.81 |
| HP-411-NLY | |
| CN 934 | 68 |
| ENPA | 21 |
| LA | 5 |
| IOMP | 2 |
| MPTMS | 2 |
| I-1700 | 2 |
| HP-512-NHN | |
| CN 934 | 68 |
| ENPA | 21 |
| HDDA | 5 |
| IOMP | 4 |
| T-1700 | 2 |
| HP-300-NLN | |
| CN 934 | 68 |
| ENPA | 21 |
| LA | 5 |
| IOMP | 4 |
| I-1700 | 2 |
| HP-600-NHY | |
| CN 934 | 68 |
| ENPA | 21 |
| HDDA | 5 |
| IOMP | 2 |
| MPTMS | 2 |
| I-1700 | 2 |
| HP-800-PLY | |
| CN966R60 | 79.33 |
| PBTA | 7.05 |
| EEEA | 6.81 |
| TEGDA | 2.89 |
| MPTMS | 1.96 |
| I-1700 | 1.96 |
| HP-900-PHN | |
| CN966R60 | 79.33 |
| PETA | 7.05 |
| DEGDA | 5.00 |
| TEGDA | 2.89 |
| IOMP | 1.96 |
| I-1700 | 1.96 |
| EEEA | 1.81 |
| HP-1300-NMM | |
| CN 934 | 68 |
| ENPA | 21 |
| LA | 2.5 |
| HDDA | 2.5 |
| IOMP | 3 |
| I-1700 | 2 |
| MPTMS | 1 |
| HP-1400-PMM | |
| CN966R60 | 79.33 |
| PETA | 7.05 |
| EFEA | 4.31 |
| TEGDA | 2.89 |
| DEGDA | 2.5 |
| IOMP | 0.98 |
| MPTMS | 0.98 |
| I-700 | 1.96 |

Example 4

Two secondary UV-curable formulations were were designed to provide two different glass transition temperatures. The formulations were prepared simply by weighing the appropriate amount of ingredients and mixing them with a mechanical stirrer. The blends were then filtered through 1.2 micrometer filters. The viscosity of each of these formulations was between 6,000 and 7,000 cP at 23° C.

| MATERIALS: | |
|---|---|
| HDDA | 1,6-Hexanediol diacrylate (Sartomer SR 238) |
| CN983B88 | CN983 B88 Sartomer Oligomer |
| CN970A60 | CN970A60 Sartomer Oligomer |
| TPGDA | Tripropylene glycol diaciylate (Sartomer SR 306) |
| D-1173 | Darocur 1173 (Ciba Specialty Chemicals) |

-continued

COMPOSITIONS:
HS-L

| Material | wt. fraction |
|---|---|
| CN970A60 | 80.58 |
| TPGDA | 16.50 |
| D-1173 | 2.91 |

HS-H

| Material | wt. fraction |
|---|---|
| CN983 B88 | 83.5 |
| HDDA | 13.59 |
| D-1173 | 2.91 |

Example 5

Glass optical fibers were drawn and coated using several primary/secondary coating combinations. The fibers were drawn in a standard production draw tower facility. The two coatings were applied onto the fiber using a dual-coating die, and both coatings were cured simultaneously with high intensity UV lamps. The delamination resistance of these fibers at room temperature and at 140° C. was measured. These results, along with the measured in-situ modulus (IM) and pull-out force (PO) are shown in the table below.

| Primary/Secondary | Delam at 22° C. | Delam at 140° C. | IM (psi) | PO (lbs) |
|---|---|---|---|---|
| HP 600-NHY/HS-H | 656 | 92 | 169 | 2.3 |
| HP 600-NHY/HS-L | 470 | 98 | 175 | 2.66 |
| HP 411-NLY/HS-L | 428 | 128 | 137 | 2.21 |
| HP 512-NHN/HS-L | 433 | 106 | 147 | 2.37 |
| HP 1300-NMM/HS-L | 495 | | 125 | 2.27 |
| CONTROL | 218 | 168 | 75 | 2.31 |
| HP 900-PHN/HS-L | 203 | 67 | 161 | 1.71 |
| HP 900-PHN/HS-H | 196 | 68 | 137 | 0.52 |
| HP 210-PHY/HS-H | 207 | 59 | 224 | 2.14 |
| HP 210-PHY/HS-L | 172 | 67 | 217 | 1.99 |
| HP 800-PLY/HSL | 189 | 66 | 175 | 1.52 |
| HP 1400-PMM/HS-L | 216 | | 157 | 1.78 |
| HP 107-PLN/HS-L | 203 | | 112 | 1.41 |

These results show that an important factor affecting resistance to delamination is the chemical nature of the coating. In addition, we have found that fibers with primary coatings based on a polyether backbone and non-polar monomers (the first five fibers in the above table) have outstanding behavior in two respects:

a. Their resistance to delamination at room temperature is much higher than that of the control, which implies they are very robust
b. Their resistance to delamination at high temperature is much lower than that of the control, which correlates with good strippability.

The last seven fibers in the above table are based on primary coatings with a polyester backbone and polar monomers. The room temperature delamination resistance of these fibers is similar to that of the control, but their delamination resistance at elevated temperatures is much lower than that of the control. Therefore these fibers should have adequate (though not outstanding) robustness, but excellent stripping behavior.

These trials demonstrate two useful series of coated fibers. The primary coatings comprise either a difunctional polyether urethane acrylate oligomer or a difunctional polyester urethane acrylate oligomer, in an amount between 40% and 85% by weight, and a photoindicator in an amount between 0.1% and 10% by weight. In addition the coatings comprise one or more of the following: 1) a monofunctional acrylate monomer with at least one aromatic moiety (typically less than 40% by weight), 2) a monofunctional aliphatic acrylate monomer (typically less than 10% by weight), or 3) a difunctional aliphatic acrylate monomer (typically less than 10% by weight). The coatings can also advantageously include a trifunctional acrylate monomer (typically less than 10% by weight), an alkoxysilane coupling agent (0–5%) and a mercapton chain transfer agent (0–5%).

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. An optical fiber coated with a radiation-cured primary coating of polymeric material, the optical fiber comprising an elongated strand of glass that is adapted to guide lightwaves along its length, the primary coating of polymeric material being CHARACTERIZED BY
an in situ modulus that resides within the range: 90 to 500 psi at 20° C.;
a first delamination resistance at 20° C.; and
a second delamination resistance at a temperature in the range 100–200° C. which is less than 40% of the first delamination resistance.

2. The optical fiber of claim 1 wherein the first delamination resistance is greater than 180 grams.

3. The optical fiber of claim 1 wherein the first delamination resistance is greater than 400 grams.

4. The optical fiber of claim 1 wherein the second delamination resistance is less than 130 grams.

5. The optical fiber of claim 1 wherein the second delamination resistance is less than 30% of the first.

6. The optical fiber of claim 1 wherein the primary coating material comprises a polyether oligomer, one or more monomers, and a photoinitiator.

7. The optical fiber of claim 1 wherein the primary coating material comprises an oligomer based on a polyether backbone that is end-capped with acrylate groups via urethane linkages.

8. The optical fiber of claim 1 further including a secondary layer of coating material that surrounds the primary layer of coating material, the secondary layer having a substantially higher equilibrium modulus than the primary coating material.

9. The optical fiber of claim 1 wherein a plurality of said fibers are disposed in a longitudinal array with longitudinal axes thereof being substantially parallel to one another, said fibers being surrounded by a matrix bonding material that fills interstices between adjacent optical fibers and extends to a periphery that envelops the array.

10. The bonded array of claim 9 wherein said bonded array is substantially flat.

11. The optical fiber of claim 1 wherein a plurality of the fibers are disposed in a core tube that extends along a longitudinal axis of a cable, the cable including: (i) a plastic jacket that encloses the core tube, and (ii) strength members having tensile stiffness for receiving loads applied to the cable.

12. The optical fiber of claim 11 wherein said fibers are positioned in a longitudinal array with longitudinal axes thereof being substantially parallel to one another, said fibers being surrounded by a matrix bonding material that fills interstices between adjacent optical fibers and extends to a periphery that envelops the array.

13. The optical fiber of claim 1 wherein the primary coating comprises:

a difunctional polyester or polyether urethane acrylate oligomer in an amount between 40% and 85% by weight;

a photoinitiator in an amount between 0.1% and 10% by weight; and one or more of the following: 1) a monofunctional acrylate monomer with at least one aromatic moiety, 2) a monofunctional aliphatic acrylate monomer, or 3) a difunctional aliphatic acrylate monomer.

14. The optical fiber of claim 13 further comprising a trifunctional acrylate monomer.

15. The optical fiber of claim 13 further comprising an alkoxysilane coupling agent.

16. The optical fiber of claim 13 further comprising a mercapton chain transfer agent.

* * * * *